US011292552B2

United States Patent
Obuchi et al.

(10) Patent No.: US 11,292,552 B2
(45) Date of Patent: *Apr. 5, 2022

(54) PISTON ASSEMBLY FOR HUMAN-POWERED VEHICLE

(71) Applicant: Shimano Inc., Osaka (JP)

(72) Inventors: Kohei Obuchi, Osaka (JP); Yasuyuki Komada, Osaka (JP); Nobuyoshi Fujii, Osaka (JP)

(73) Assignee: Shimano Inc., Osaka (JP)

( * ) Notice: Subject to any disclaimer, the term of this patent is extended or adjusted under 35 U.S.C. 154(b) by 3 days.

This patent is subject to a terminal disclaimer.

(21) Appl. No.: 16/877,862

(22) Filed: May 19, 2020

(65) Prior Publication Data
US 2021/0362801 A1 Nov. 25, 2021

(51) Int. Cl.
*B62L 3/02* (2006.01)
*B62K 23/06* (2006.01)
*F16J 1/00* (2006.01)

(52) U.S. Cl.
CPC .............. *B62L 3/023* (2013.01); *B62K 23/06* (2013.01); *F16J 1/006* (2013.01)

(58) Field of Classification Search
CPC ......... B62L 3/023; B62K 23/06; B62K 23/02; F16J 1/006
See application file for complete search history.

(56) References Cited

U.S. PATENT DOCUMENTS

| 2,884,292 | A | * | 4/1959 | Doner | ..................... | F16D 65/22 |
| | | | | | | 92/245 |
| 3,940,938 | A | * | 3/1976 | Durham | ................... | B60T 11/16 |
| | | | | | | 60/588 |
| 4,208,074 | A | * | 6/1980 | Ishigami | ................. | B60T 8/265 |
| | | | | | | 303/9.63 |
| 4,655,462 | A | | 4/1987 | Balsells | | |
| 5,979,904 | A | | 11/1999 | Balsells | | |
| 9,874,238 | B2 | | 1/2018 | Kariyama et al. | | |
| 2003/0121262 | A1 | * | 7/2003 | Lumpkin | ................ | B60T 11/22 |
| | | | | | | 60/594 |

(Continued)

FOREIGN PATENT DOCUMENTS

CN 201385746 Y 1/2010

OTHER PUBLICATIONS

Polyethylene, Encyclopedia Britannica, Nov. 15, 2019 (Year: 2019).*

*Primary Examiner* — Vinh Luong
(74) *Attorney, Agent, or Firm* — Global IP Counselors, LLP (57) ABSTRACT

A piston assembly is provided for a human-powered vehicle. The piston assembly includes a main body and a primary seal. The main body is configured to be movable from a rest position to an actuated position along an actuation direction in a cylinder bore. The primary seal includes a primary seal body arranged on the main body. The primary seal body is made of a resin material. The main body includes a first part and a second part. The first part is at least partly arranged upstream of the primary seal with respect to the actuation direction. The second part is coupled to the first part to be at least partly arranged downstream of the primary seal with respect to the actuation direction. The at least one of the first part and the second part includes a support portion supporting the primary seal.

18 Claims, 7 Drawing Sheets

(56) References Cited

U.S. PATENT DOCUMENTS

| | | | | |
|---|---|---|---|---|
| 2008/0310971 | A1* | 12/2008 | Harada | F04B 53/12 |
| | | | | 417/254 |
| 2009/0120751 | A1* | 5/2009 | Lin | B60T 7/10 |
| | | | | 188/344 |
| 2012/0273308 | A1* | 11/2012 | Uchida | B60T 17/043 |
| | | | | 188/72.4 |
| 2013/0333994 | A1* | 12/2013 | Jordan | B62L 3/023 |
| | | | | 188/344 |
| 2014/0318307 | A1* | 10/2014 | Kariyama | B60T 11/046 |
| | | | | 74/502.4 |
| 2015/0083531 | A1* | 3/2015 | Abhold | B60T 7/102 |
| | | | | 188/151 R |
| 2017/0015292 | A1* | 1/2017 | Ruckh | B60T 11/22 |
| 2019/0039685 | A1* | 2/2019 | Nakai | B62L 3/023 |
| 2021/0362803 | A1* | 11/2021 | Obuchi | B62K 23/06 |

* cited by examiner

FIG. 15

PISTON ASSEMBLY FOR HUMAN-POWERED VEHICLE

BACKGROUND

Technical Field

This disclosure generally relates to a piston assembly. More specifically, the present disclosure relates to a piston assembly for a human powered vehicle.

Background Information

Human-powered vehicles (e.g., bicycles) are sometimes provided with hydraulic devices. Examples of some hydraulic devices include a hydraulic operating device and a hydraulic operated device. A hydraulic operating device is operated by a user to hydraulically operate the hydraulic operated device. For example, in a hydraulic braking system, a hydraulic brake operating device is fluidly connected to a hydraulic brake device such that a user operates a brake lever of a hydraulic brake operating device to actuate a hydraulic brake device to engage a brake rotor or a rim of a wheel. One example of hydraulic braking system is disclosed in U.S. Pat. No. 9,874,238 B2.

SUMMARY

Generally, the present disclosure is directed to various features of a piston assembly for a human-powered vehicle such as a bicycle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a piston assembly for a human-powered vehicle. The piston assembly basically comprises a main body, a primary seal and a secondary seal. The main body is configured to be movable from a rest position to an actuated position along an actuation direction in a cylinder bore. The primary seal includes a primary seal body arranged on the main body. The primary seal body is made of a resin material. The main body includes a first part and a second part. The first part is at least partly arranged upstream of the primary seal with respect to the actuation direction. The second part is coupled to the first part to be at least partly arranged downstream of the primary seal with respect to the actuation direction. The at least one of the first part and the second part includes a support portion supporting the primary seal.

With the piston assembly according to the first aspect, it is possible to provide a piston assembly that has an improved sliding with respect to the cylinder bore by using a resin material for the primary seal.

In accordance with a second aspect of the present disclosure, the piston assembly according to the first aspect is configured so that the resin material includes one of polytetrafluoroethylene and polyethylene.

With the piston assembly according to the second aspect, it is possible to inexpensively manufacture the primary seal.

In accordance with a third aspect of the present disclosure, the piston assembly according to the first aspect is configured so that the resin material includes polyimide-filled polytetrafluoroethylene.

With the piston assembly according to the third aspect, it is further possible to inexpensively manufacture the primary seal.

In accordance with a fourth aspect of the present disclosure, a piston assembly for a human-powered vehicle. The piston assembly basically comprises a main body and a primary seal. The main body is configured to be movable from a rest position to an actuated position along an actuation direction in a cylinder bore. The primary seal is arranged on the main body. The main body includes a first part and a second part. The first part is at least partly arranged upstream of the primary seal with respect to the actuation direction. The second part inserted into the first part to be at least partly arranged downstream of the primary seal with respect to the actuation direction. The at least one of the first part and the second part includes a support portion supporting the primary seal.

With the piston assembly according to the fourth aspect, it is possible to easily install the primary seal between the first part and the second part.

In accordance with a fifth aspect of the present disclosure, a piston assembly for a human-powered vehicle. The piston assembly basically comprises a main body and a primary seal. The main body is configured to be movable from a rest position to an actuated position along an actuation direction in a cylinder bore. The primary seal is arranged on the main body. The main body includes a first part and a second part. The first part is at least partly arranged upstream of the primary seal with respect to the actuation direction. The second part is detachably and reattachably attached to the first part to be at least partly arranged downstream of the primary seal with respect to the actuation direction. The at least one of the first part and the second part includes a support portion supporting the primary seal.

With the piston assembly according to the fifth aspect, it is possible to easily install and replace the primary seal between the first part and the second part.

In accordance with a sixth aspect of the present disclosure, the piston assembly according to any one of the first to fifth aspects is configured so that the first part is made of a first material, and the second part is made of a second material that is different from the first material.

With the piston assembly according to the sixth aspect, it is possible to select appropriate materials to improve sliding of the main body with respect to the cylinder bore while still providing a reliable piston assembly.

In accordance with a seventh aspect of the present disclosure, the piston assembly according to the sixth aspect is configured so that the first material is a resin material, and the second material is a metallic material.

With the piston assembly according to the seventh aspect, it is possible to improve sliding with respect to the cylinder bore by using a resin material for the first part that may contact the cylinder bore while using a metallic material for the second part to secure the first part and the second part together.

In accordance with an eighth aspect of the present disclosure, the piston assembly according to the seventh aspect is configured so that the second part includes a tapping screw portion configured to be threadedly engaged to the first part.

With the piston assembly according to the eighth aspect, it is possible to easily attach the first part and the second part together.

In accordance with a ninth aspect of the present disclosure, the piston assembly according to any one of the first to eighth aspects is configured so that the support portion is integral with the second part, and the second part is threadedly engaged to the first part.

With the piston assembly according to the ninth aspect, it is possible to easily manufacture the first part and the second part, and easily attach the first part and the second part together.

In accordance with a tenth aspect of the present disclosure, the piston assembly according to any one of the first to eighth aspects is configured so that the support portion is integral with the first part, and the second part is threadedly engaged to the support portion of the first part.

With the piston assembly according to the tenth aspect, it is possible to easily manufacture the first part and the second part, and easily attach the first part and the second part together.

In accordance with an eleventh aspect of the present disclosure, the piston assembly according to any one of the first to tenth aspects is configured so that the primary seal body includes a primary lip portion configured to be in contact with the cylinder bore in an arranged state where the piston assembly is arranged in the cylinder bore, and the primary seal further includes a biasing part that is configured to outwardly bias the primary lip portion of the primary seal body in the arranged state.

With the piston assembly according to the eleventh aspect, it is possible to ensure reliable contact between the primary seal and the cylinder bore to obtain a good seal.

In accordance with a twelfth aspect of the present disclosure, the piston assembly according to the eleventh aspect is configured so that the biasing part is a coil spring.

With the piston assembly according to the twelfth aspect, it is possible to firmly maintain the primary seal in contact with the cylinder bore.

In accordance with a thirteenth aspect of the present disclosure, the piston assembly according to any one of the first to tenth aspects further comprises a secondary seal arranged on the main body upstream of the primary seal with respect to the actuation direction.

With the piston assembly according to the thirteenth aspect, it is possible to improve the seal between the main body and the cylinder bore.

In accordance with a fourteenth aspect of the present disclosure, the piston assembly according to the thirteenth aspect is configured so that the main body further includes a third part coupled to the first part, and the third part supports the secondary seal.

With the piston assembly according to the fourteenth aspect, it is possible to easily install the secondary seal.

In accordance with a fifteenth aspect of the present disclosure, the piston assembly according to the fourteenth aspect is configured so that the first part is made of a first material, the second part is made of a second material that is different from the first material, and the third part is made of a third material that is different from the second material.

With the piston assembly according to the fifteenth aspect, it is possible to optimize the materials for assembly.

In accordance with a sixteenth aspect of the present disclosure, the piston assembly according to the fifteenth aspect is configured so that the first material is a resin material, and the second material is a metallic material.

With the piston assembly according to the sixteenth aspect, it is possible to improve sliding of the main body with respect to the cylinder bore by using a resin material for the first part that may contact the cylinder bore while using a metallic material for the second part to secure the first part and the second part together.

In accordance with a seventeenth aspect of the present disclosure, the piston assembly according to the fifteenth or sixteenth aspect is configured so that the third material is same as the first material.

With the piston assembly according to the seventeenth aspect, it is possible to lower manufacturing costs.

In accordance with an eighteenth aspect of the present disclosure, the piston assembly according to the fourteenth aspect is configured so that the third part is press-fitted to the first part.

With the piston assembly according to the eighteenth aspect, it is possible to inexpensively couple the third part to the first part.

Also, other objects, features, aspects and advantages of the disclosed piston assembly will become apparent to those skilled in the art from the following detailed description, which, taken in conjunction with the annexed drawings, discloses preferred embodiments of the piston assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
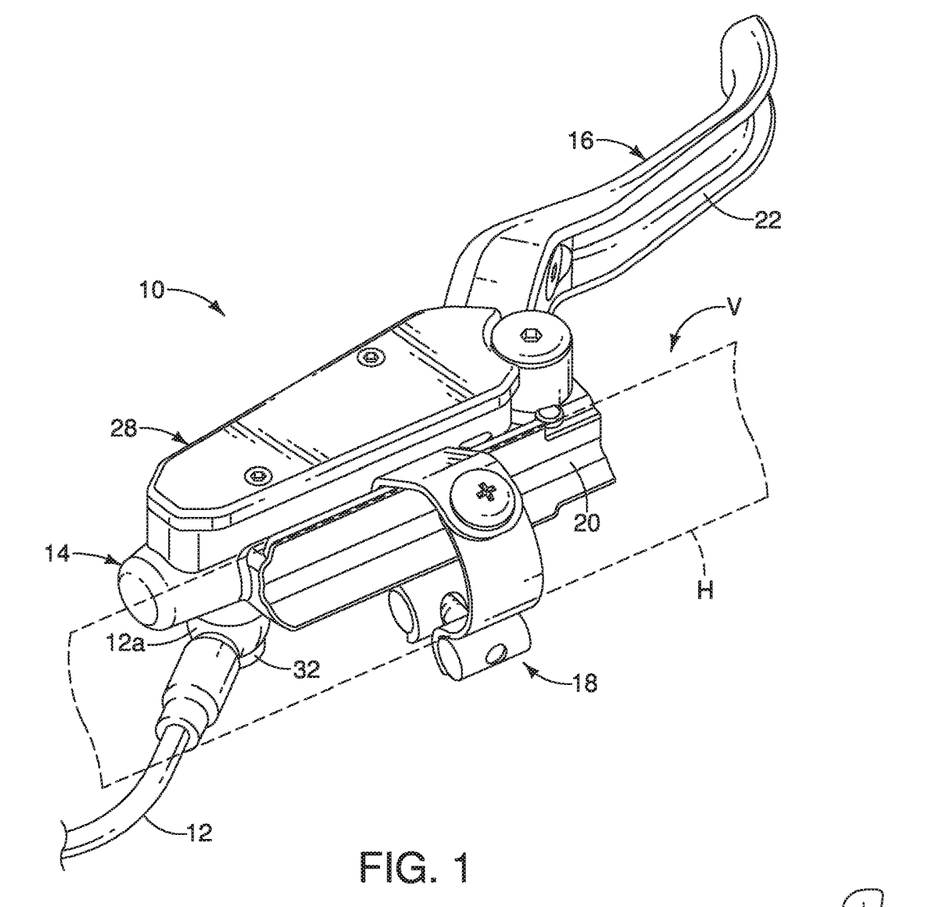
FIG. 1 is a top perspective view of a portion of a handlebar of a human-powered vehicle that is equipped with a hydraulic operating device having a piston assembly (not shown in this Figure) in accordance with a first embodiment.

Referring initially to FIG. 1, an operating device 10 is provided for a human-powered vehicle V (only a handlebar H is shown) in accordance with a first illustrative embodiment. Here, in the illustrated embodiments, the operating device 10 is a hydraulic operating device that is provided for the human-powered vehicle V (e.g., a bicycle). The operating device 10 is mounted to the handlebar H of the human-powered vehicle V. Here, the human-powered vehicle V is preferably a bicycle. Thus, the operating device 10 is a bicycle hydraulic brake operating device. Hereinafter, the operating device 10 is consistently referred as the hydraulic operating device 10.

The hydraulic operating device 10 is fluidly connected to a hydraulic operated device (not shown) by a hydraulic hose 12. As illustrated in FIGS. 1 to 4, the hydraulic operating device 10 is a right-hand side hydraulic brake actuating device that is operated by the rider's right hand from a rest or non-operated position (FIGS. 1 to 3) to an operated position (FIG. 4) for actuating the hydraulic operated device such as a disc brake caliper or a rim brake caliper. It will be apparent to those skilled in the human-powered vehicle field that the configuration of the hydraulic operating device 10 can be adapted to a left-hand side hydraulic brake actuating device that is operated by the rider's left hand. Also, the hydraulic operating device 10 can be used with other vehicle components other than a brake caliper.

The hydraulic operating device 10 basically comprises a base 14, an operating member 16 and a handlebar mounting structure 18. Here, the handlebar mounting structure 18 is coupled to the base 14. The base 14 is a rigid member that is typically made of a metallic material. The base 14 includes a handlebar contact portion 20. The handlebar contact portion 20 is configured to contact the handlebar H in a mounted state in which the base 14 is mounted to the handlebar H by the handlebar mounting structure 18. It will be apparent from this disclosure that the handlebar mounting structure 18 is not limited to the illustrated embodiment, and that other types of handlebar mounting structures can be used.

Figure 3:
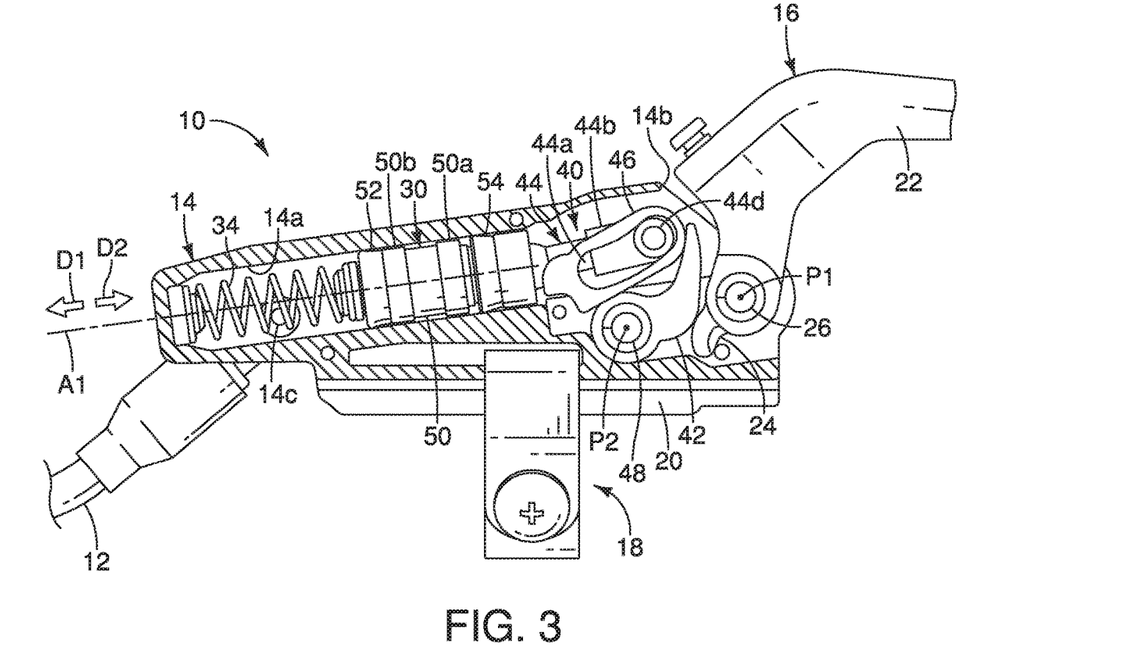
FIG. 3 is a partial cross-sectional view of the hydraulic operating device illustrated in FIGS. 1 and 2 with the piston assembly shown in a full view and in which the cross section is taken along section plane that is perpendicular to and passes through a cylinder axis of a cylinder bore of the base of the hydraulic operating device.
Figure 4:
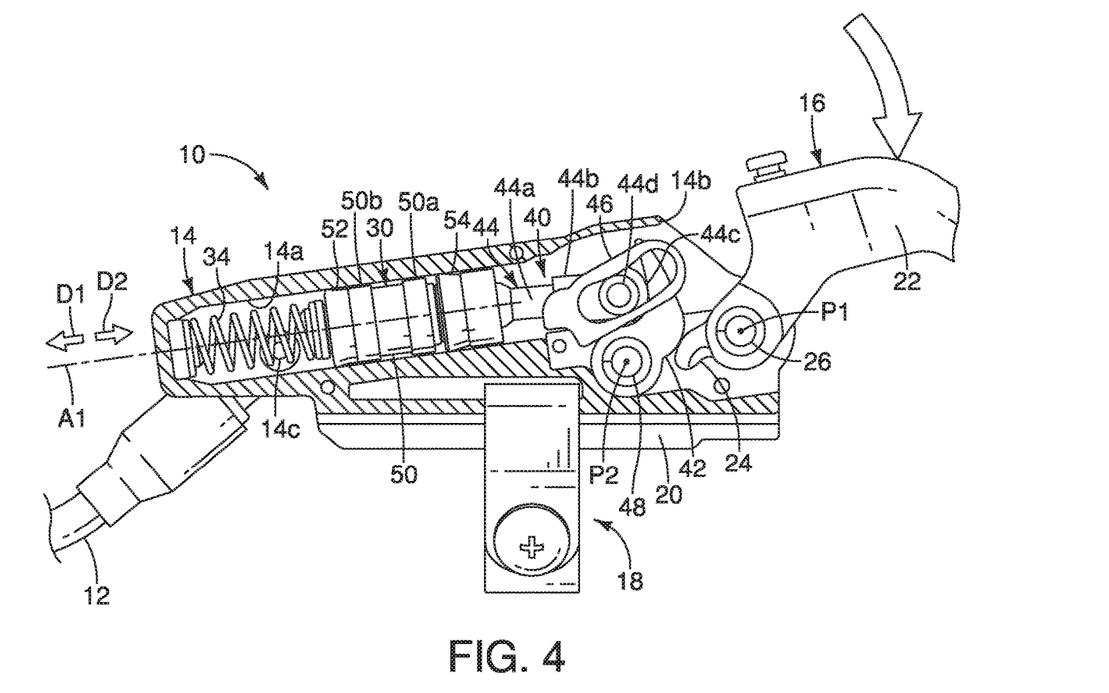
FIG. 4 is a partial cross-sectional view, similar to FIG. 3, of the hydraulic operating device illustrated in FIGS. 1 to 3, but in which the operating member has been moved to an actuated position.
Figure 5:
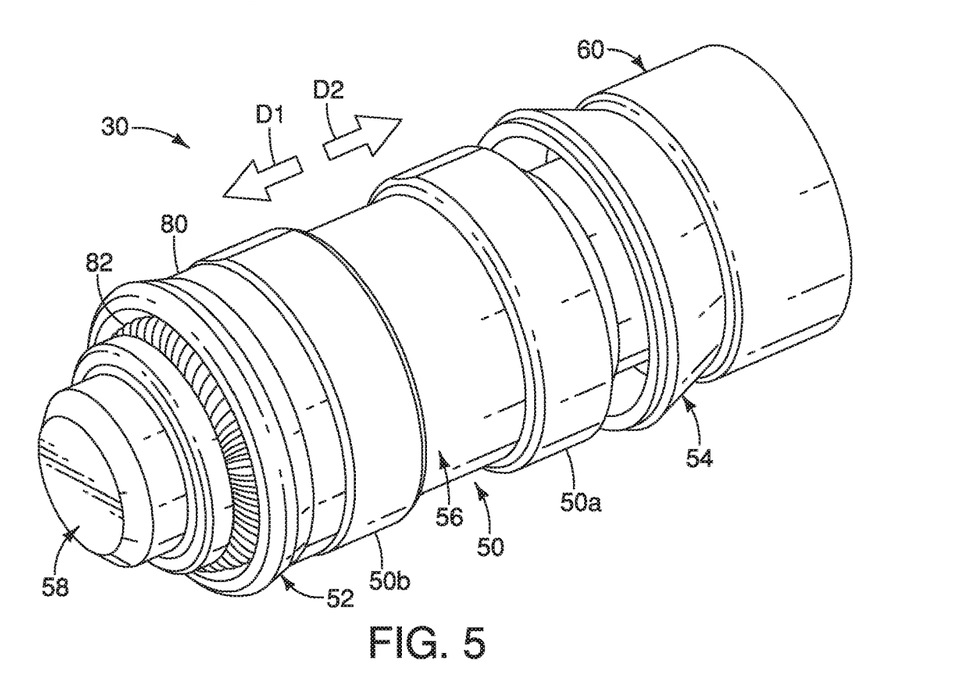
FIG. 5 is a first end perspective view of the piston assembly illustrated in FIGS. 3 and 4 in accordance with a first embodiment.
Figure 6:
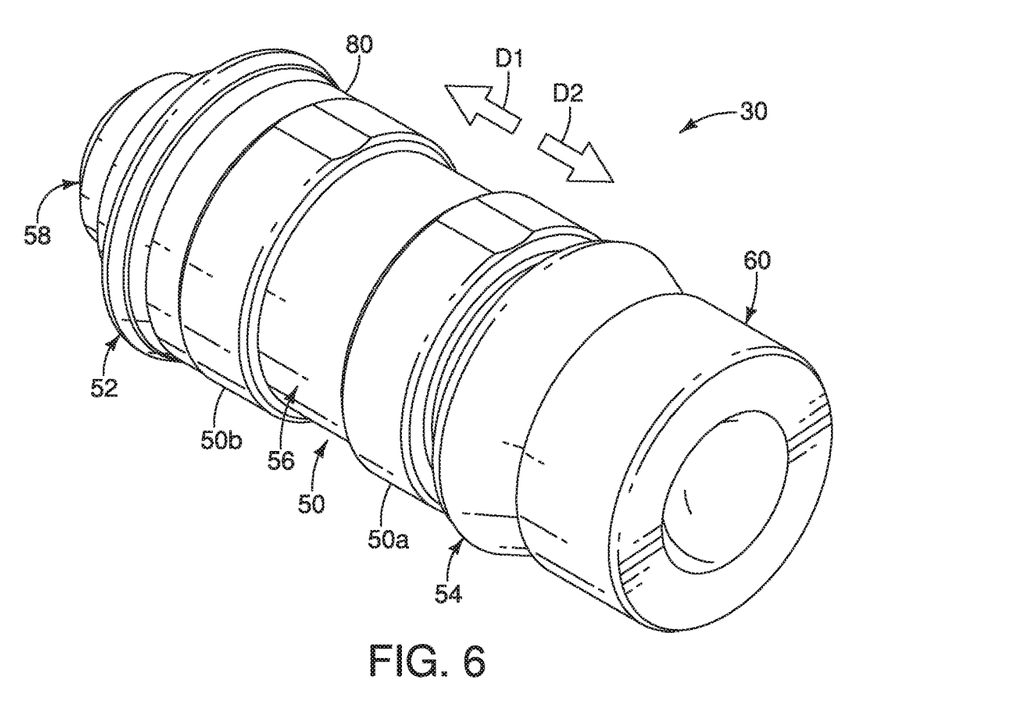
FIG. 6 is a second end perspective view of the piston assembly illustrated in FIGS. 3 to 5.

Here, the operating member 16 includes a user operating lever 22 and a torque input member 24. The user operating lever 22 is pivotally coupled to the base 14 by a pivot pin 26 about a pivot axis P1 between a rest position (see FIGS. 1 to 3) and an operated position (FIG. 4). The user operating lever 22 is a rigid member that is typically made of a metallic material or a hard resin material. The torque input member 24 is also pivotally coupled to the base 14 by the pivot pin 26 about the pivot axis P1. The torque input member 24 is a rigid member that is typically made of a metallic material or a hard resin material.

Figure 2:
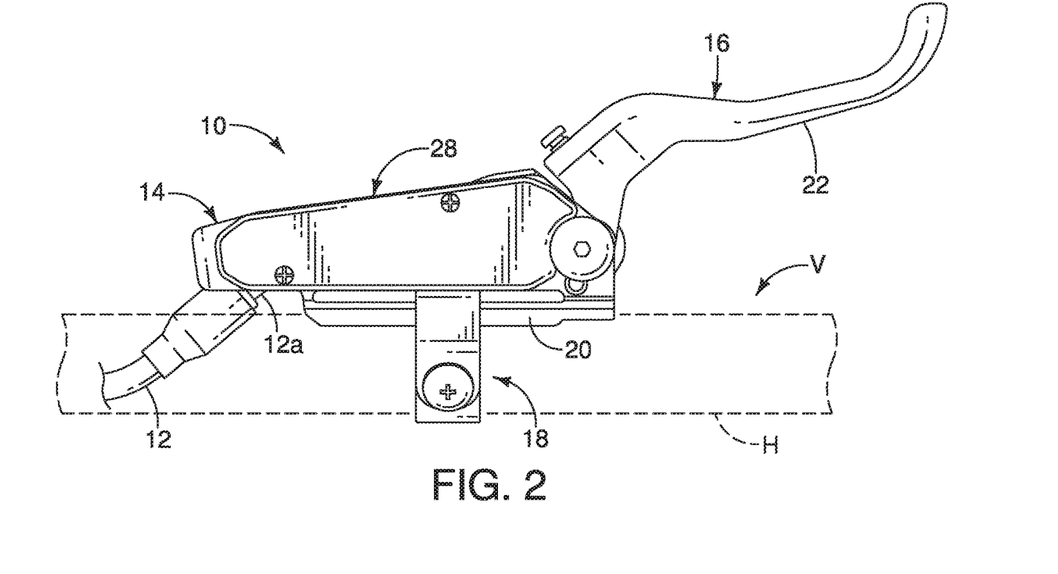
FIG. 2 is a top plan view of the portion of the handlebar and the hydraulic operating device illustrated in FIG. 1.

As mentioned above, in the illustrated embodiments, the hydraulic operating device 10 is a bicycle hydraulic operating device. In such a case, as seen in FIGS. 3 and 4, the base 14 includes a cylinder bore 14a that defines the cylinder axis A1. Here, as seen in FIGS. 1 and 2, the hydraulic operating device 10 includes a hydraulic reservoir 28 that is filled with a fluid such as mineral oil. The hydraulic reservoir 28 is in fluid communication with the cylinder bore 14a in a state where the operating lever 22 is in the rest position. Since hydraulic reservoirs are well known, the hydraulic reservoir 28 will not be discussed or illustrated in detail herein.

The hydraulic operating device 10 further comprises a piston assembly 30 that is movably provided in the cylinder bore 14a. Thus, the piston assembly 30 is provided for the human-powered vehicle V. The piston assembly 30 is inserted into the cylinder bore 14a from an open end 14b of the cylinder bore 14a. The base 14 has a fluid port 14c that is in fluid communication with the cylinder bore 14a. The hydraulic hose 12 is fluidly connected to the fluid port 14c by a hose connector 12a of the hydraulic hose 12 and a banjo bolt 32 (see FIG. 1).

A biasing element 34 is disposed in the cylinder bore 14a, and biases the piston assembly 30 to a non-actuated (rest or non-operated) position. Here, the biasing element 34 is a coil compression spring that biases the piston assembly 30 to the non-actuated position. The biasing element 34 also biases the operating member 16 to its rest position (i.e., no external force applied to the operating member 16). Thus, the piston assembly 30 compresses the biasing element 34 as the piston assembly 30 moves in the cylinder bore 14a in response to an operation of the user operating lever 22 of the operating member 16.

The piston assembly 30 is operatively coupled to the operating member 16 to move the piston assembly 30 within the cylinder bore 14a in response to operation of the operating member 16. Namely, as seen in FIG. 4, the piston assembly 30 is coupled to the operating member 16 to be pushed in response to a pivotal movement of the operating member 16 from the rest position to the operated position. The piston assembly 30 moves linearly along the cylinder axis A1 within the cylinder bore 14a in response to operation of the operating member 16. Here, the hydraulic operating device 10 further comprises a torque transmission mechanism 40 that operatively connects the piston assembly 30 and the torque input member 24 of the operating member 16. In this way, by a user operating the user operating lever 22, the torque transmission mechanism 40 pushes the piston assembly 30 in the cylinder bore 14a.

Here, the torque transmission mechanism 40 includes a torque transmission member 42, a connection rod 44 and a pair of cam guides 46 (only one shown). The torque transmission member 42 is pivotally coupled to the base 14 by a pivot pin 48 about a pivot axis P2. The torque transmission member 42 is a rigid member that is typically made of a metallic material or a hard resin material. As the torque input member 24 of the operating member 16 is pivoted by a user pivoting the user operating lever 22, the torque input member 24 pivots the torque transmission member 42, which in turn pushes the connection rod 44. As a result of the connection rod 44 being pushed by the torque transmission member 42, the piston assembly 30 is pushed in the cylinder bore 14a by the connection rod 44. Thus, the connection rod 44 operatively connects the piston assembly 30 to the torque transmission member 42.

Here, the connection rod 44 basically includes a shaft 44a, a yoke 44b, a roller 44c and a support pin 44d. The shaft 44a has one end operatively connected to the piston assembly 30 and a second end fixed to the yoke 44b. The yoke 44b rotatably supports the roller 44c via the support pin 44d. The roller 44c is preferably rotatably supported on the support pin 44d by a bearing (not shown). The ends of the support pin 44d are located in the cam guides 46 for controlling the movement of the connection rod 44 with respect to the base 14.

Specifically, the cam guides 46 are mounted to the base 14 on opposite sides of the connection rod 44. Thus, the cam guides 46 support the ends of the support pin 44d of the connection rod 44 to the base 14. The cam guides 46 are shaped to control movement of the piston assembly 30 in response to the movement of the user operating lever 22 of the operating member 16. Namely, each of the cam guides 46 has a profiled cam surface that controls the movement of the piston assembly 30 with respect to the movement of the operating member 16.

Turning now to FIGS. 5 to 9, the piston assembly 30 will now be discussed in more detail. The piston assembly 30 comprises a main body 50 and a primary seal 52. In this illustrated embodiment, the piston assembly 30 further comprises a secondary seal 54. However, it will be apparent from this disclosure that the secondary seal 54 can be omitted as need and/or desired. The primary seal 52 and the secondary seal 54 are provided on the main body 50 such that the primary seal 52 and the secondary seal 54 slidably contact the cylinder bore 14a. Thus, the primary seal 52 and the secondary seal 54 are in sealing contact with the cylinder bore 14a and the main body 50.

As seen in FIGS. 3 and 4, the main body 50 is configured to be movable from a rest position (FIG. 3) to an actuated position (FIG. 4) along an actuation direction D1 in the cylinder bore 14a. In other words, the main body 50 of the piston assembly 30 moves against the urging force of the biasing element 34 in the actuation direction D1 in the cylinder bore 14a in response to actuation of the user operating lever 22 of the operating member 16. Once the user operating lever 22 of the operating member 16 is released, the main body 50 of the piston assembly 30 moves in the cylinder bore 14a under the urging force of the biasing element 34 in a return direction D2 that is opposite the actuation direction D1. Thus, the main body 50 has an upstream end 50a that is located nearest to the open end 14b of the cylinder bore 14a, and a downstream end 50b that is located nearest to the fluid port 14c of the base 14. In other words, the term "upstream" and the term "downstream" as used herein refer to locations with respect to the actuation direction D1.

Referring again to FIGS. 5 to 9, the main body 50 includes a first part 56 and a second part 58. In this illustrated embodiment, the main body 50 further includes a third part 60 coupled to the first part 56. In the case in which the secondary seal 54 is omitted, then the third part 60 can also be omitted. Here, the second part 58 is detachably and reattachably attached to the first part 56. However, it will be apparent from this disclosure that the first part 56 and the second part 58 can be permanently fix together if needed and/or desired. Here, the third part 60 is a separate part from the first part 56. The third part 60 is attached to the first part 56 at the opposite end from the second part 58. For example, the third part 60 is press-fitted to the first part 56. However, it will be apparent from this disclosure that the third part 60 can be detachably and reattachably attached to the first part 56 in the same manner that the second part 58 is coupled to the first part 56.

The first part 56 is at least partly arranged upstream of the primary seal 52 with respect to the actuation direction D1. The second part 58 is coupled to the first part 56 to be at least partly arranged downstream of the primary seal 52 with respect to the actuation direction D1. Thus, the primary seal 52 is at least partly arranged between the first part 56 and the second part 58. The third part 60 is coupled to the first part 56 to be at least partly arranged upstream of the secondary seal 54 with respect to the actuation direction D1. Thus, the secondary seal 54 is at least partly arranged between the first part 56 and the third part 60. In this illustrated embodiment, the third part 60 has a spherical concave portion at the upstream end 50a and a ball portion of the connection rod 44 is connected to the spherical concave portion of the third part 60. Namely, the main body 50 is connected to the connection rod 44 with a ball joint.

The first part 56 has an outermost diameter that is equal to or slightly smaller than an inner diameter of the cylinder bore 14a so that the first part 56 can be slidably in contact with the cylinder bore 14a. On the other hand, the second part 58 has an outermost diameter that is smaller than the outermost diameter of the first part 56 so that the second part 58 is spaced radially inward of the cylinder bore 14a. Preferably, the third part 60 has an outermost diameter that is equal to or slightly smaller than an inner diameter of the cylinder bore 14a so that the third part 60 can be slidably in contact with the cylinder bore 14a.

In the illustrated embodiment, the first part 56 is made of a first material. The second part 58 is made of a second material that is different from the first material. Preferably, the first material of the first part 56 is a resin material. The second material of the second part 58 is a metallic material. The resin material of the first part 56 has a lower coefficient of friction than the metallic material of the second part 58. In this way, the first part 56 can slide easily on the inner surface of the cylinder bore 14a. The third part 60 is made of a third material that is different from the second material. Preferably, the third material of the third part 60 is a resin material. More preferably, as in the illustrated embodiment, the third material of the third part 60 is same as the first material of the first part 56. In this way, the third part 60 can slide easily on the inner surface of the cylinder bore 14a.

Figure 7:
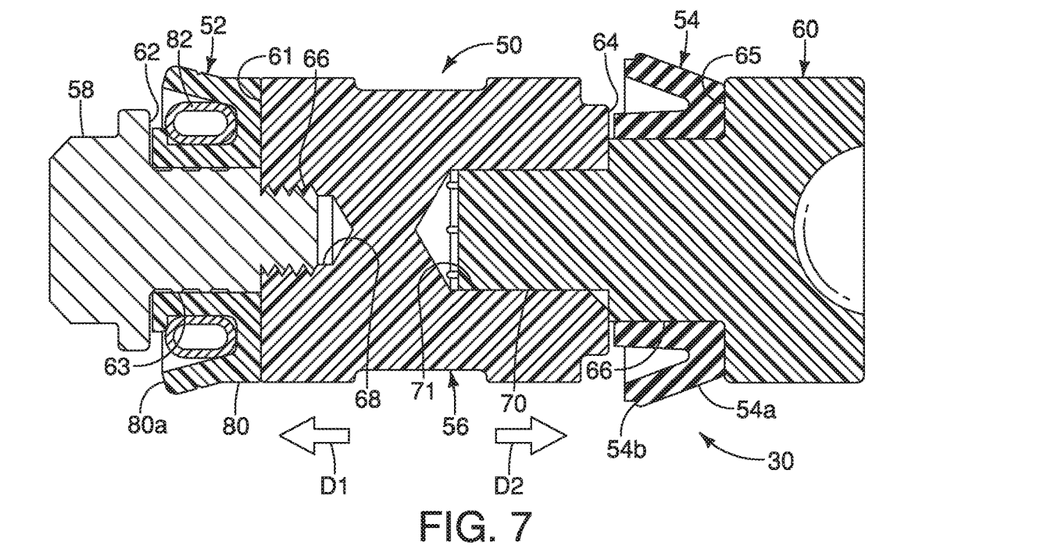
FIG. 7 is a longitudinal cross-sectional view of the piston assembly illustrated in FIGS. 3 to 6.

Referring to FIG. 7, the first part 56 is configured to limit movement of the primary seal 52 with respect to the main body 50 in the return direction D2. In particular, the first part 56 has a first axial abutment surface 61 facing the primary seal 52. The second part 58 is configured to limit movement of the primary seal 52 with respect to the main body 50 in the actuation direction D1. In particular, the second part 58 has a second axial abutment surface 62 facing the primary seal 52. In this way, the movement of the primary seal 52 with respect to the main body 50 is limited in the axial direction between the first part 56 and the second part 58 when the piston assembly 30 moves in the cylinder bore 14a. At least one of the first part 56 and the second part 58 includes a support or connecting portion 63 for supporting the primary seal 52. Here, in the embodiment of FIGS. 5 to 9, the second part 58 includes the support portion 63 that supports the primary seal 52. The support portion 63 is disposed in an axial position between the first axial abutment surface 61 and the second axial abutment surface 62. The support portion 63 is integral with the second part 58. Thus, here, the second part 58 supports the primary seal 52.

The first part 56 is configured to limit movement of the secondary seal 54 with respect to the main body 50 in the actuation direction D1. In particular, the first part 56 has a third axial abutment surface 64 facing the secondary seal 54. The third part 60 is configured to limit movement of the secondary seal 54 with respect to the main body 50 in the return direction D2. In particular, the third part 60 has a fourth axial abutment surface 65 facing the secondary seal 54. In this way, the movement of the secondary seal 54 with respect to the main body 50 is limited in the axial direction between the first part 56 and the third part 60 when the piston assembly 30 moves in the cylinder bore 14a. At least one of the first part 56 and the third part 60 includes a support or connecting portion 64 supporting the secondary seal 54. Here, in the embodiment of FIGS. 5 to 9, the third part 60 includes the support portion 64 that supports the primary seal 52. Preferably, the support portion 64 is integral with the third part 60. Thus, here, the third part 60 supports the secondary seal 54.

Figure 8:
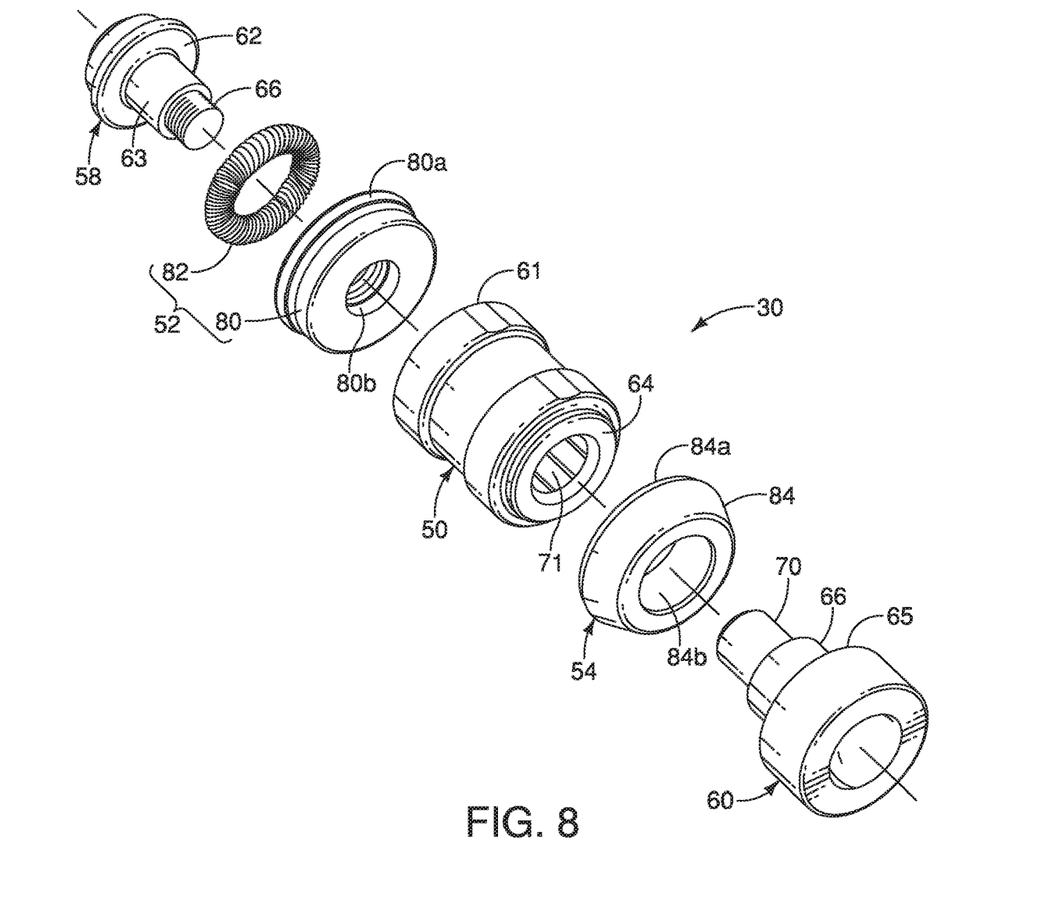
FIG. 8 is a first exploded perspective view of the piston assembly illustrated in FIGS. 3 to 7.
Figure 9:
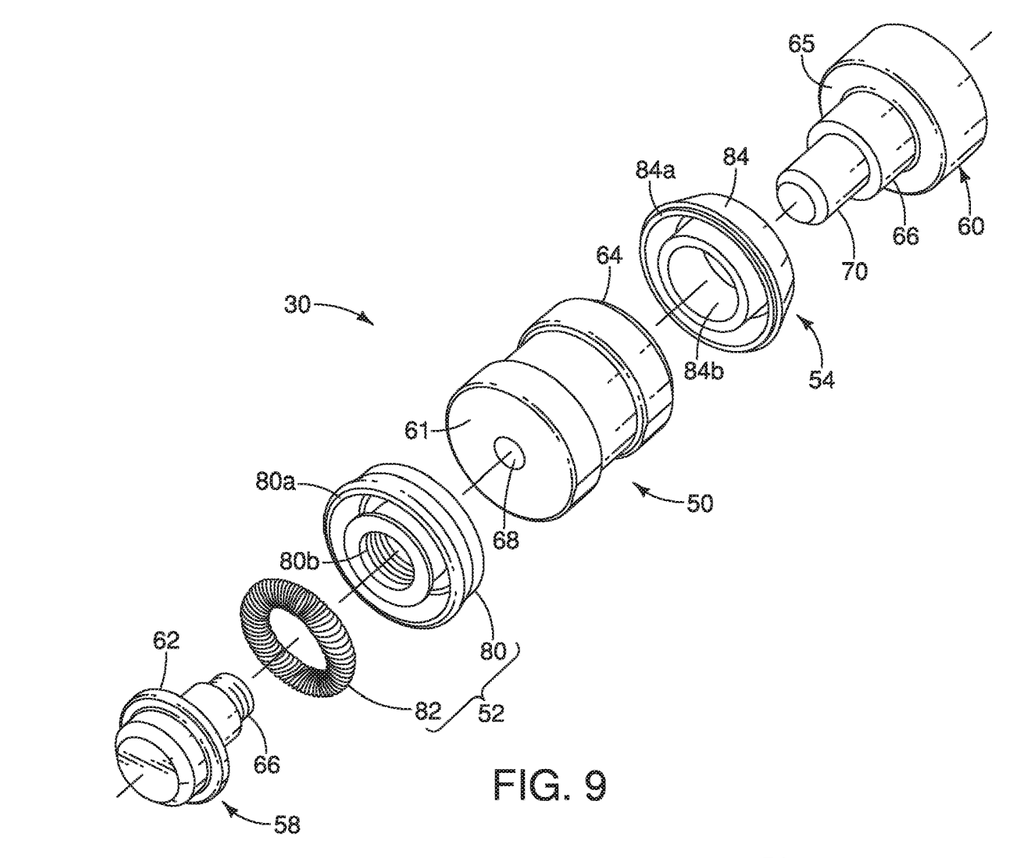
FIG. 9 is a second exploded perspective view of the piston assembly illustrated in FIGS. 3 to 8.

As mentioned above, the second part 58 is detachably and reattachably attached to the first part 56 to be at least partly arranged downstream of the primary seal 52 with respect to the actuation direction D1. In particular, the second part 58 is inserted into the first part 56 to be at least partly arranged downstream of the primary seal 52 with respect to the actuation direction D1. Here, the second part 58 is threadedly engaged to the first part 56. More specifically, the second part 58 includes a tapping screw portion 66 that is configured to be threadedly engaged to the first part 56. Here, the first part 56 includes a blind bore 68 that is tapped by the tapping screw portion 66 as the second part 58 is connected to the first part 56. Thus, the blind bore 68 becomes a threaded bore after the second part 58 is connected to the first part 56. Alternatively, the blind bore 68 can be pre-threaded. Also, alternatively, the second part 58 and/or the third part 60 can be attached to the first part 56 in other manners (e.g., adhesion, welding, and so on) after arranging the primary seal 52 and/or the secondary seal 54 in their appropriate position(s).

As mentioned above, the third part 60 is attached to the first part 56 to be at least partly arranged upstream of the secondary seal 54 with respect to the actuation direction D1. In particular, the third part 60 is inserted into the first part 56 to be at least partly arranged upstream of the secondary seal 54 with respect to the actuation direction D1. Here, the third part 60 is press-fitted to the first part 56. More specifically, the third part 60 includes a pressing portion 70 that is configured to be press-fitted into a blind bore 71 of the first part 56. Here, the blind bore 71 has a plurality of longitudinal ribs that are plastically deformed to create an interference fit.

The primary seal 52 includes a primary seal body 80 arranged on the main body 50. The primary seal body 80 is made of the first seal material. Here, the primary seal body 80 is made of a resin material. Thus, the first seal material includes a resin material. Preferably, the first seal material (the resin material) includes one of polytetrafluoroethylene and polyethylene. More preferably, the first seal material includes polyimide-filled polytetrafluoroethylene.

The primary seal body 80 is an O-ring that has uniform cross sectional profile. The primary seal body 80 includes a primary lip portion 80a configured to be in contact with the cylinder bore 14a in an arranged state where the piston assembly 30 is arranged in the cylinder bore 14a. The primary seal body 80 further includes a center opening 80b configured to snugly contact the support portion 63 of the second part 58. The primary seal 52 further includes a biasing part 82 that is configured to outwardly bias the primary lip portion 80a of the primary seal body 80 in the arranged state. Here, the biasing part 82 is a coil spring. However, it will be apparent from this disclosure that the biasing part 82 is not limited to a coil spring. For example, the biasing part 82 can be an annular elastomeric O-ring or an annular cantilever or V-spring having a V-shaped cross section, or any other suitable member or members that can be used to apply a radially urging force to the primary lip portion 80a of the primary seal body 80. Thus, preferably, the primary seal 52 is a spring-energized seal as the biasing part 82 is included.

The secondary seal 54 is arranged on the main body 50 upstream of the primary seal 52 with respect to the actuation direction D1. Namely, the secondary seal 54 includes a secondary seal body 54a arranged on the main body 50 upstream of the primary seal 52 with respect to the actuation direction D1. The secondary seal body 54a is an O-ring that has uniform cross sectional profile. The secondary seal body 54a is made of a second seal material that is more elastic than the first seal material. The secondary seal body 54a includes a secondly lip portion 54b that is configured to be in contact with the cylinder bore 14a in an arranged state where the piston assembly 30 is arranged in the cylinder bore 14a. Preferably, the second seal material of the secondary seal body 54a includes a rubber material.

Figure 10:
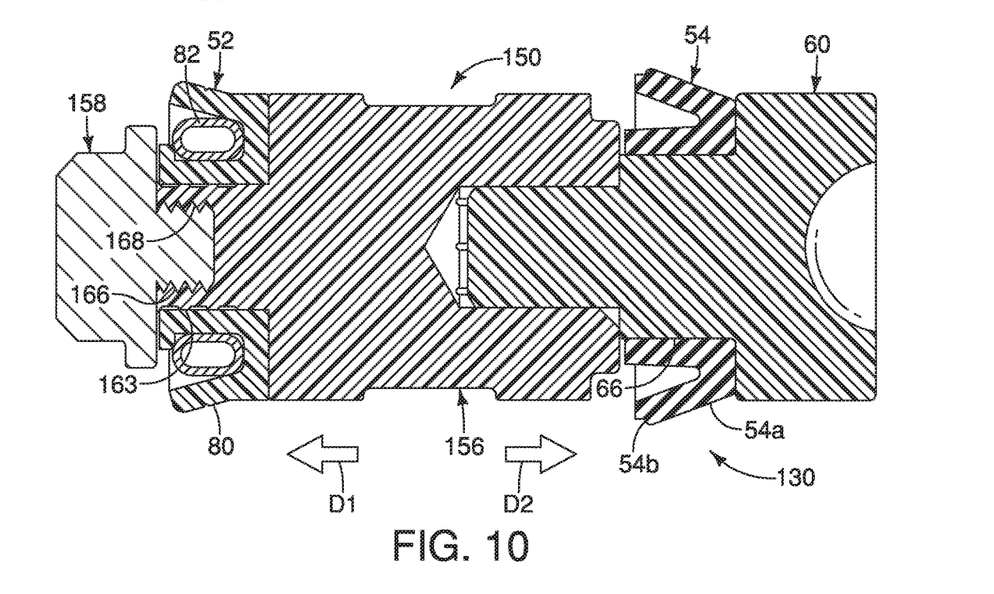
FIG. 10 is a longitudinal cross-sectional view of a piston assembly in accordance with a second embodiment for use in the hydraulic operating device illustrated in FIG. 1.

Referring now to FIG. 10, a piston assembly 130 in accordance with a second embodiment will now be explained. Basically, the piston assembly 130 is used in place of the piston assembly 30 in the hydraulic operating device 10. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The piston assembly 130 comprises a main body 150, the primary seal 52 of the first embodiment and the secondary seal 54 of the first embodiment. The main body 130 includes a first part 156, a second part 158 and the third part 60 of the first embodiment. As mentioned above, the secondary seal 54 and the third part 60 can be omitted as needed and/or desired. Here, the third part 60 is coupled to the first part 156 and supports the secondary seal 54 in the same manner as in the piston assembly 30 of the first embodiment. However, in the second embodiment, the primary seal 52 is supported on the first part 156, and the connection between the first part 156 and the second part 158 has been modified.

Here, in the second embodiment, the first part 156 includes a support or connecting portion 163 for supporting the primary seal 52. The support portion 163 is integral with the first part 156. Also, here, in the second embodiment, the second part 158 is threadedly engaged to the support or connecting portion 163 of the first part 156. More specifically, the second part 158 includes a tapping screw portion 166 that is configured to be threadedly engaged to the first part 156. Here, the first part 156 includes a blind bore 168 that is tapped by the tapping screw portion 166 when the second part 158 is connected to the first part 156. Thus, the blind bore 168 becomes a threaded bore after the second part 158 is connected to the first part 156. Alternatively, the blind bore 168 can be pre-threaded. Also, alternatively, the second part 158 and/or the third part 60 can be attached to the first part 156 in other manners (e.g., adhesion, welding, and so on) after arranging the primary seal 52 and/or the secondary seal 54 in their appropriate position(s).

Figure 11:
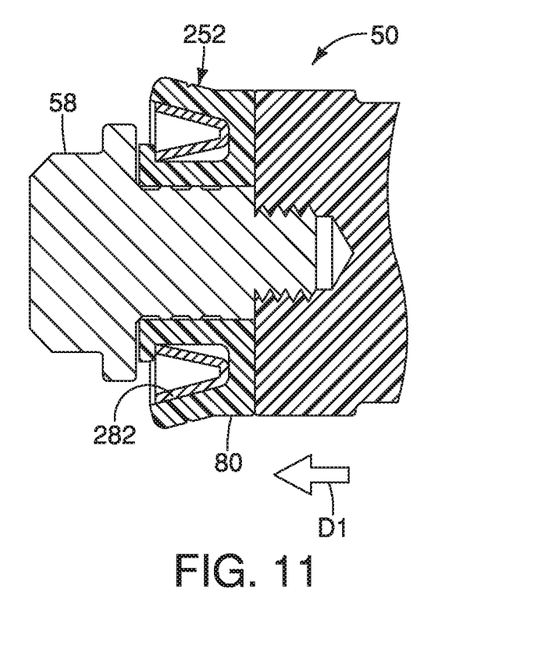
FIG. 11 is a partial longitudinal cross-sectional view of a portion of the piston assembly illustrated in FIG. 1 but with a first modified primary seal.

Referring now to FIG. 11, a first modified primary seal 252 is provided between the first part 56 of the main body 50 and the second part 58 of the main body 50. The first modified primary seal 252 includes the primary seal body 80, discussed above, and a biasing part 282. Here, the biasing part 282 is an annular cantilever spring having a V-shaped or U-shaped cross section. The biasing part 282 can be made of a suitable metallic material, a resin material or an elastomeric material.

Figure 12:
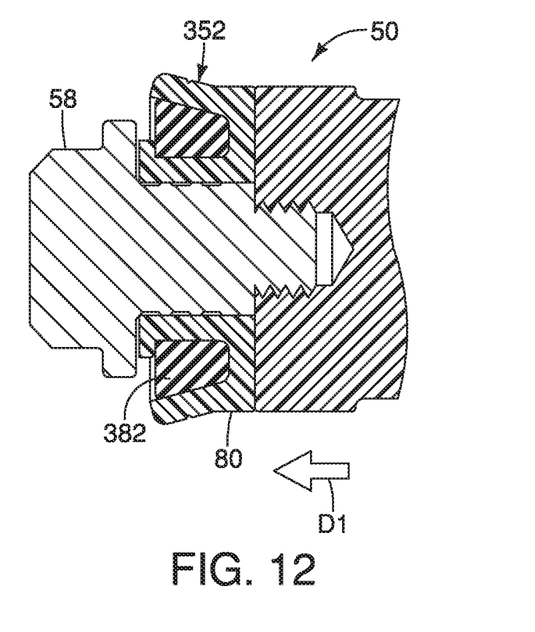
FIG. 12 is a partial longitudinal cross-sectional view of a portion of the piston assembly illustrated in FIG. 1 but with a second modified primary seal.

Referring now to FIG. 12, a second modified primary seal 352 is provided between the first part 56 of the main body 50 and the second part 58 of the main body 50. The second modified primary seal 352 includes the primary seal body 80, discussed above, and a biasing part 382. Here, the biasing part 382 is an annular elastomeric spring that fills the annular space inside the primary seal body 80. However, the biasing part 382 can be an O-ring with a circular cross section. The biasing part 382 is shown as being removable but could be embedded or bonded to the primary seal body 80.

Figure 13:
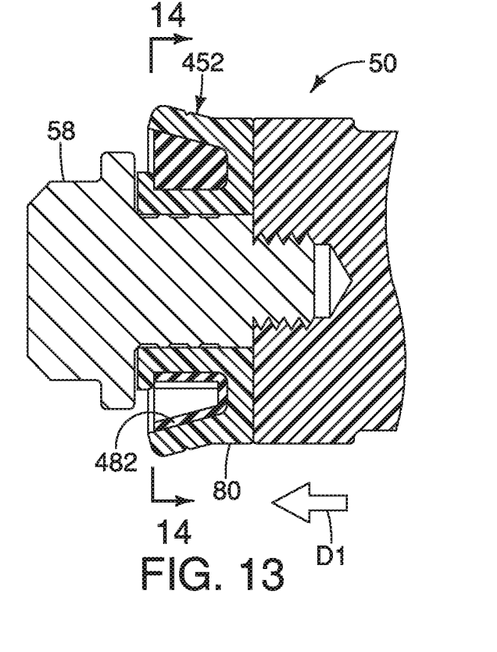
FIG. 13 is a partial longitudinal cross-sectional view of a portion of the piston assembly illustrated in FIG. 1 but with a third modification of the primary seal as seen along section line 13-13 of FIG. 14.
Figure 14:
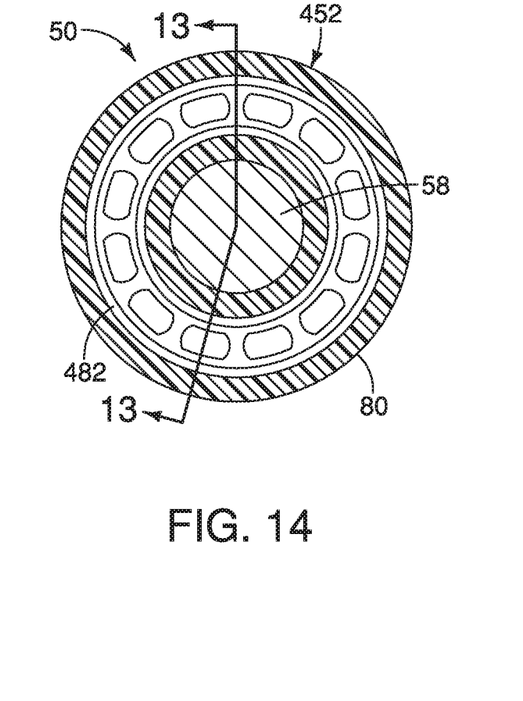
FIG. 14 is a transverse cross-sectional view of the piston assembly illustrated in FIG. 13 as seen along section line 14-14 of FIG. 13.

Referring now to FIGS. 13 and 14, a third modified primary seal 452 is provided between the first part 56 of the main body 50 and the second part 58 of the main body 50. The third modified primary seal 452 includes the primary seal body 80, discussed above, and a biasing part 482. Here, the biasing part 482 is an annular elastomeric spring with a plurality of recesses. These recesses can be through holes and/or have other shapes. In the illustrated embodiment, the biasing part 482 fills the annular space inside the primary seal body 80. However, the biasing part 482 can be an O-ring with a circular cross section. The biasing part 482 is preferably removable but could be embedded or bonded to the primary seal body 80.

Figure 15:
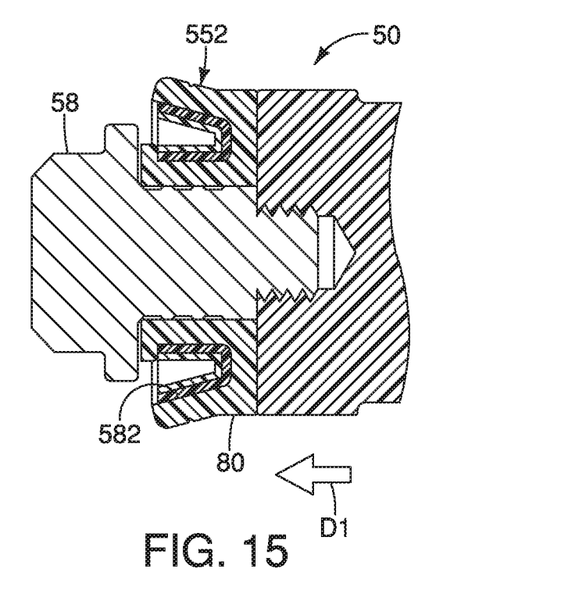
FIG. 15 is a partial longitudinal cross-sectional view of a portion of the piston assembly illustrated in FIG. 1 but with a fourth modification of the primary seal.

Referring now to FIG. 15, a fourth modified primary seal 552 is provided between the first part 56 of the main body 50 and the second part 58 of the main body 50. The fourth modified primary seal 552 includes the primary seal body 80, discussed above, and a biasing part 582. Here, the biasing part 582 is an annular cantilever spring having a V-shaped or U-shaped cross section with two resin layers. However, the biasing part 582 can have more than two layers as needed and/or desired. As shown, the layers of the biasing part 582 can have different hardnesses as needed and/or desired. The biasing part 582 is shown as being removable but could be embedded or bonded to the primary seal body 80. The hardness of resins of the biasing part 582 can be harder or softer than the primary seal body 80 as needed and/or desired.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., the bicycle) in an upright, riding position and equipped with the piston assembly. Accordingly, these directional terms, as utilized to describe the piston assembly should be interpreted relative to a human-powered vehicle (e.g., the bicycle) in an upright riding position on a horizontal surface and that is equipped with the piston assembly. The terms "left" and "right" are used to indicate the "right" when referencing from the right side as viewed from the rear of the human-powered vehicle (e.g., the bicycle), and the "left" when referencing from the left side as viewed from the rear of the human-powered vehicle (e.g., the bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A piston assembly for a human-powered vehicle, the piston assembly comprising:
a main body configured to be movable from a rest position to an actuated position along an actuation direction in a cylinder bore; and
a primary seal including a primary seal body arranged on the main body, the primary seal body being made of a resin material,
the main body including
a first part at least partly arranged upstream of the primary seal with respect to the actuation direction,
a second part coupled to the first part to be at least partly arranged downstream of the primary seal with respect to the actuation direction, a portion of the second part extending through the primary seal to engage with the first part, and
a third part coupled to the first part at a location upstream of the primary seal, the second and third parts being spaced from each other, and
at least one of the first part and the second part including a support portion supporting the primary seal.

2. The piston assembly according to claim 1, wherein the resin material includes one of polytetrafluoroethylene and polyethylene.

3. The piston assembly according to claim 1, wherein the resin material includes polyimide-filled polytetrafluoroethylene.

4. The piston assembly according to claim 1, wherein the first part is made of a first material, and
the second part is made of a second material that is different from the first material.

5. The piston assembly according to claim 4, wherein the first material is a resin material, and
the second material is a metallic material.

6. The piston assembly according to claim 5, wherein the second part includes a tapping screw portion configured to be threadedly engaged to the first part.

7. The piston assembly according to claim 1, wherein the support portion is integral with the second part, and the second part is threadedly engaged to the first part.

8. The piston assembly according to claim 1, wherein the support portion is integral with the first part, and the second part is threadedly engaged to the support portion of the first part.

9. The piston assembly according to claim 1, wherein the primary seal body includes a primary lip portion configured to be in contact with the cylinder bore in an arranged state where the piston assembly is arranged in the cylinder bore, and
the primary seal further includes a biasing part that is configured to outwardly bias the primary lip portion of the primary seal body in the arranged state.

10. The piston assembly according to claim 9, wherein the biasing part is a coil spring.

11. The piston assembly according to claim 1, further comprising
a secondary seal arranged on the main body upstream of the primary seal with respect to the actuation direction.

12. The piston assembly according to claim 11, wherein the main body further includes a third part coupled to the first part, aid
the third part supports the secondary seal.

13. The piston assembly according to claim 12, wherein the first part is made of a first material,
the second part is made of a second material that is different from the first material, and
the third part is made of a third material that is different from the second material.

14. The piston assembly according to claim 13, wherein the first material is a resin material, and
the second material is a metallic material.

15. The piston assembly according to claim 13, wherein the third material is same as the first material.

16. The piston assembly according to claim 12, wherein the third part is press-fitted to the first part.

17. A piston assembly for a human-powered vehicle, the piston assembly comprising:
a main body configured to be movable from a rest position to an actuated position along an actuation direction in a cylinder bore, and
a primary seal arranged on the main body,
the main body including
a first part at least partly arranged upstream of the primary seal with respect to the actuation direction,
a second part inserted into the first part to be at least partly arranged downstream of the primary seal with respect to the actuation direction, a portion of the second part extending through the primary seal to engage with the first part, and
a third part coupled to the first part at a location upstream of the primary seal, the second and third parts being spaced from each other, and
at least one of the first part and the second part including a support portion supporting the primary seal.

18. A piston assembly for a human-powered vehicle, the piston assembly comprising:
a main body configured to be movable from a rest position to an actuated position along an actuation direction in a cylinder bore; and
a primary seal arranged on the main body,
the main body including
a first part at least partly arranged upstream of the primary seal with respect to the actuation direction,
a second part detachably and reattach ably attached to the first part to be at least partly arranged downstream of the primary seal with respect to the actuation direction, a portion of the second part extending through the primary seal to engage with the first part, and
a third part coupled to the first part at a location upstream of the primary seal second and third parts being spaced from each other, and
at least one of the first part and the second part including a support portion supporting the primary seal.

* * * * *